N. POWER.
FRICTIONAL GEARING.
APPLICATION FILED FEB. 1, 1916.

1,250,652.

Patented Dec. 18, 1917.
2 SHEETS—SHEET 1.

Inventor
Nicholas Power
By his Attorney
W. B. Morton

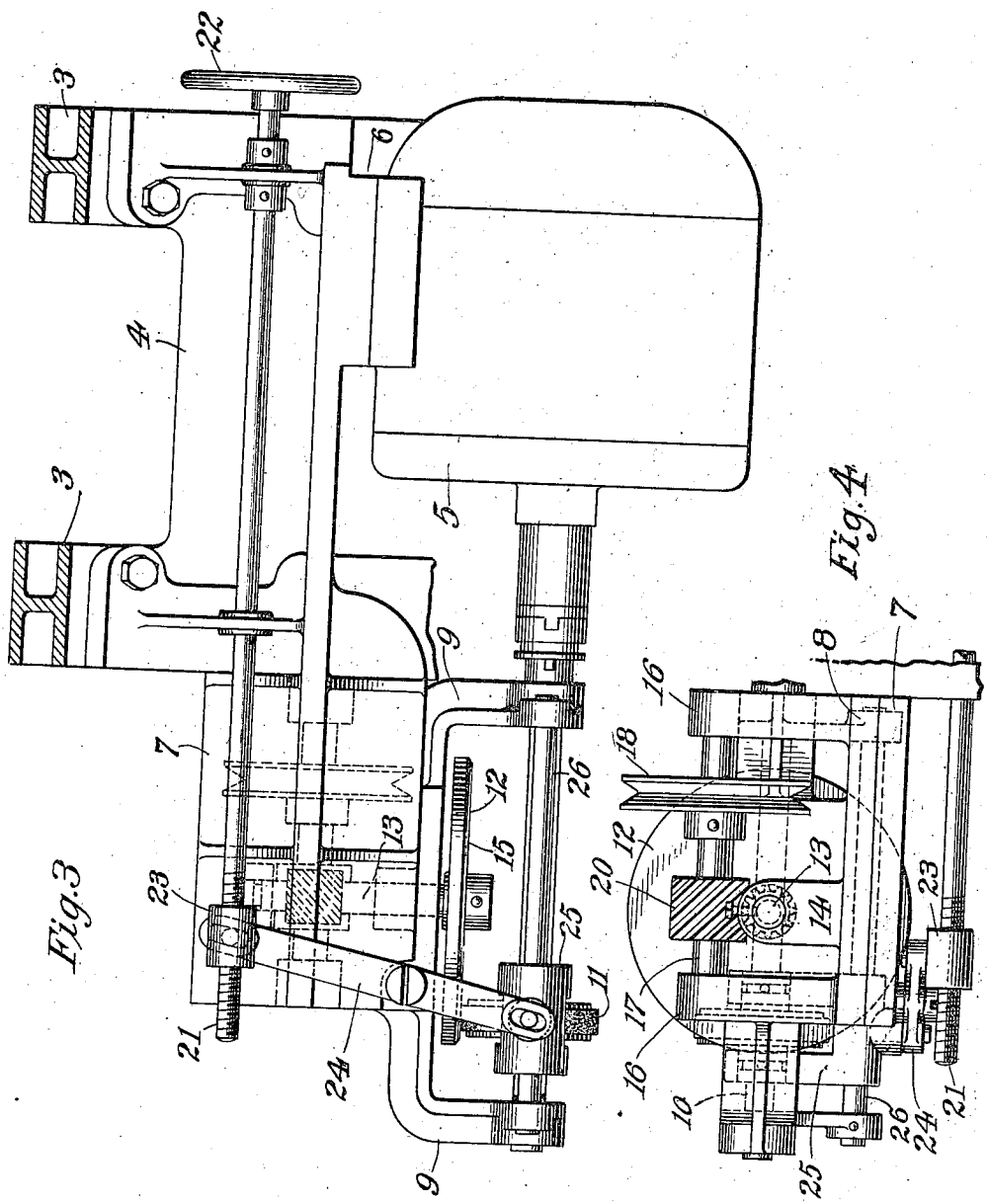

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

FRICTIONAL GEARING.

1,250,652.  Specification of Letters Patent.  Patented Dec. 18, 1917.

Application filed February 1, 1916.  Serial No. 75,485.

*To all whom it may concern:*

Be it known that I, NICHOLAS POWER, a citizen of the United States, and a resident of the borough of Brooklyn, county of Kings, city and State of New York, have invented new and useful Improvements in Frictional Gearing, of which the following is a specification.

This invention relates to improvements in gearing and particularly to gearing embodying contacting friction members of either fixed or variable gear ratio.

The object of the invention is to provide in a transmission gearing of this class automatic means for regulating driving pressure of the friction faces in proportion to the load on the driven member whereby the pressure will always be sufficient to drive the load without slipping one on the other, if, of course, the power supplied to the driving member is sufficient to move the load.

One of the chief defects of friction gears as heretofore constructed lies in the difficulty of regulating the pressure of the driving faces against each other to get the most efficient operation of the gearing. This is particularly true of variable speed friction gears of the type comprising a disk, usually of metal, having the plane of its driving face normal to the axis of rotation and a coöperating friction wheel with its periphery of fiber or other friction material and adapted to be slid radially toward and from the axis of rotation of the disk to vary the gear ratio of the couple. The driving pressure is effected by means of a spring of fixed tension adjusted for the normal load to be operated, but if the load be increased beyond the normal the friction faces will slip one on the other, causing heating of the gears and excessive and uneven wear of their driving faces. With gears of this construction this fault can only be remedied by having a pressure spring of excessive strength which is itself objectionable by causing an undue load at all times and consequent wear at a faster rate than when the driving pressure is properly adjusted to the load. Gears of this type are especially liable to destruction in starting, for if the operator attempts to accelerate the speed of the driven member of the gear more rapidly than the load can respond under the maximum torque which can be transmitted at the selected speed the gears will slip with the faults enumerated above.

In my improved gearing these faults are entirely corrected, the construction being so designed that under no conditions will one gear be caused to slip on the face of the other. My improved gearing also has the further advantage of simplicity of construction, being without complicated or delicate parts to be broken or get out of order, such as the pressure spring of the gears now on the market.

In the accompanying drawings I have shown my improved gearing applied to a moving picture machine between the driving motor and the film feeding mechanism. Friction gears have been almost universally employed in this relation on all makes of motor driven machines because of the necessity of fine speed adjustment to get the best effect with each particular film. In the operation of such machines there are of necessity frequent stops and restarting to change the film, etc., whereby the friction faces are damaged and must be replaced, as an irregular operation of the film feed is fatal to proper projection. It will of course be understood, however, that the invention is not limited to the use of the improved gearing in conjunction with a moving picture machine, but covers all such uses to which the gearing may be put with advantage.

In said drawings,

Fig. 3 is an elevational view from the right of Fig. 2; and

Fig. 4 is a plan view of a portion of the apparatus shown in Fig. 2.

Figure 1:
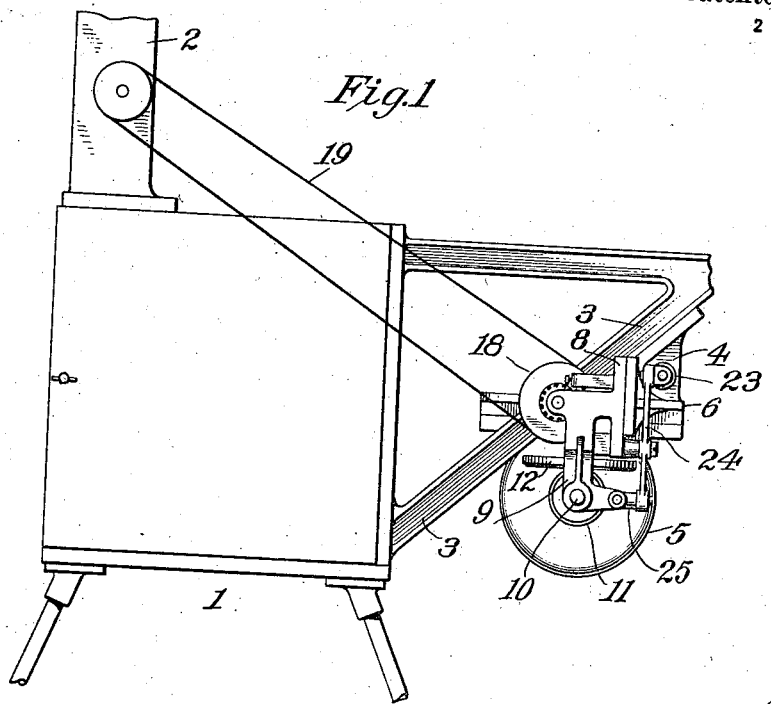
Figure 1 is a side elevation of a portion of a moving picture apparatus embodying my improved gearing.

Referring to the drawings, 1 indicates the frame of a moving picture machine on the forward part of which is supported the projecting mechanism or head 2. The frame is provided with the usual rearward extension for supporting the projecting lantern, not shown, which extension is supported by diagonal braces 3 from which the bracket 4 of the driving motor 5 is suspended. The bracket 4 comprises an upper member or hanger attached to a diagonal 3 and supporting a horizontal plate 6 from which the motor is suspended. Attached to the side of the bracket and projecting beyond the side of the frame 1 is a vertical plate 7 to which is attached the hanger 8 for the variable speed gearing. The hanger 8 is provided with spaced arms 9 having horizontal bearings for supporting the motor shaft 10, on which is slidingly mounted the driving wheel 11 of the gearing couple comprising the variable speed gear. The driven member of the gear couple consists of a metal disk 12 supported on a vertical shaft 13 mounted for free rotation in suitable bearings 14 projecting from the hanger 8 over the shaft 10 whereby the axes of the driving and driven shafts lie in the same vertical plane.

Figure 2:
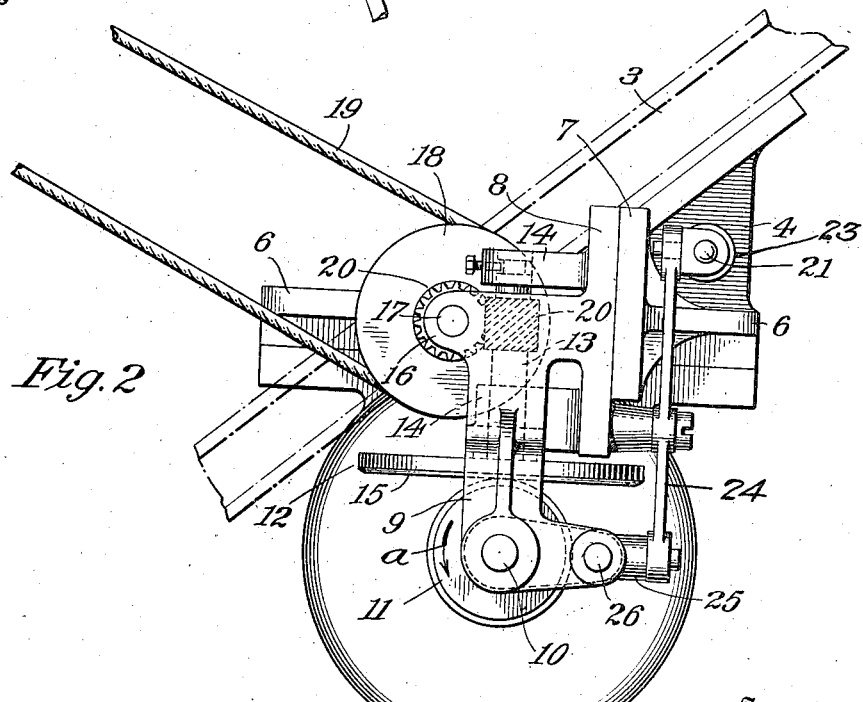
Fig. 2 is an enlarged view of a portion of Fig. 1.

The driving face of the disk 12 is on its under side and its shaft 13 is freely movable longitudinally in bearings 14 so that the disk 12 rests on the periphery of the driving wheel 11 when the latter is adjusted along its shaft to a position under the disk. The disk 12 is beveled off at its circumference as indicated at 15 so that when the wheel 11 is adjusted under the disk, the disk will be raised by the wheel so as to rest freely on the periphery of the wheel. To prevent the shaft 13 dropping out of its bearings or to position where the wheel 11 will engage the circumference of the disk, one of the bearings 14 is provided with a set-screw whose inner end projects into a groove in the shaft as shown in Fig. 2.

The hanger 8 is provided with a third pair of journals 16 in which is supported a horizontal driven shaft 17 having an attached pulley 18 from which the moving picture mechanism is driven by means of the belt 19. The shaft 17 is driven from the vertical shaft 13 by means of the spiral gears 20. The angle of the teeth of the gears 20 is such relative to the direction of rotation of the electric motor indicated in the drawing by the arrow a, as to produce a downward thrust on the shaft 13.

The friction wheel 11 may be adjusted longitudinally along the motor shaft by any preferred means, and I have illustrated for that purpose a threaded shaft 21 supported in bearings on the under side of the bracket 4, the shaft being provided on one end with a hand wheel 22 by means of which it may be adjusted. At the opposite end of the shaft it is provided with a thread of comparatively quick pitch and carries a nut 23 having a pin in its inner side engaging a slot formed in the upper end of a lever 24 pivoted to the rear face of the hanger 8, more particularly shown in Fig. 3. The lower end of the lever 24 has a pin-and-slot connection with a yoke 25 slidably mounted on a rod 26 supported by the arms 9 in parallelism with the shaft 10. The arms of the yoke 25 are forked to embrace the hub of the wheel 11 on both sides thereof, the hub being grooved to receive pins in the ends of the forks as shown by dotted lines in Fig. 4.

The range of movement of the wheel 11 is sufficient for the wheel to be moved clear of the periphery of the disk 12 when it is desired to stop the driven shaft.

In operation with the parts connected in the manner described, the electric motor will be started with the gears disconnected and the hand wheel 22 will be turned to bring the friction wheel 11 into engagement with the face of the disk 12 at its periphery to thereby start the moving picture machine at its lowest speed. The weight of the disk 12 and its shaft and gear is sufficient to cause enough friction between the driving faces to overcome the resistance of the bearings and will cause the vertical shaft to tend to rotate the shaft 17 through the medium of spiral gears 20. The reaction of the load through the spiral gears will produce a downward thrust on the shaft 13 thereby increasing the pressure between the friction faces until it is sufficient to overcome the inertia of the load and start the projecting mechanism in motion. The thrust will be determined by the load on the pulley 18 and the angle of the gear teeth. For moving picture work I have found angles of 37½° and 52½° of the vertical and horizontal shafts respectively to give very satisfactory results.

The driving engagement of the belt 19 and pulley 18 determines the maximum torque than can be transmitted through the friction gearing. If the operator attempts to accelerate the speed of the machine too rapidly the pressure between the friction faces will be automatically increased until a pressure corresponding to this maximum torque is reached, when the pulley will slip in the belt but under no circumstances can a slip between the friction faces be produced if the gears are properly proportioned. The tension of the driving belt 19 will be adjusted so that the belt will slip at a load less than that necessary to injure the film.

It will be seen that no matter how the load on the driven shaft may vary, the slip will occur between the driving belt and its pulley instead of between the friction faces of the gear couple where it produces the destructive effect above noted.

Where my improved friction gearing is used in connection with apparatus which may not be conveniently driven by a belt, a slip clutch of any improved design will be installed between the driven spiral gear and the ultimately driven load to limit the load which may come on the friction gears and prevent the electric motor being overloaded.

The maximum load of the belt or friction clutch, if used, determines the maximum pressure of engagement between the friction faces, but this pressure is not always on the gears as in the case of a spring-pressed gear couple, but only during the occasional periods of maximum load. At other times the pressure is just what is necessary to drive the load.

Another important advantage of my improved gearing is that the use of thrust bearings for either of the shafts is rendered unnecessary, the thrust of the driving engagement working against the load to be driven. With a spring-pressed couple, the spring at one end or the other must be provided with a thrust bearing which consumes power and is one of the chief points of wear in a gearing of the kind.

I claim:

1. In a power transmitting mechanism, the combination of a pair of coöperating friction members, one of said members being connected with the source of power and the other of said members to the load to be driven, and a pair of spiral gears through which the driving power is transmitted from the last mentioned friction member to the load, the end thrust produced by the load on said spiral gears acting to press said friction members into driving engagement.

2. In a power transmitting mechanism, the combination of a pair of coöperating friction members, one of said members being connected with the source of power and the other of said members to the load to be driven, a pair of spiral gears through which the driving power is transmitted from the last mentioned friction member to the load, the end thrust produced by the load on said spiral gears acting to press said friction members into driving engagement, and means in the driving connection between the driven spiral gear and the load for positively limiting the maximum load which can be placed on said gears.

3. In a power transmitting mechanism, the combination of a driving shaft, a friction member therefor, a second friction member driven therefrom, said second friction member being mounted for axial movement toward and away from the first member, a spiral gear connected to and driven by said second member, and a second spiral gear meshing with the first gear and adapted to operate the load to be driven, said gears being arranged so that the end thrust on the first mentioned gear is in the line of movement of the second friction member toward and from its coöperating friction member to thereby produce a driving pressure between said friction members proportional to the load of the spiral gears.

4. In a power transmitting mechanism, the combination of a driving shaft, a friction wheel carried thereby, a driven shaft, a coöperating friction disk carried thereby and movable toward and from said friction wheel in the axial line of said driven shaft, and a spiral gear driven by said friction wheel and axially movable therewith, and a second spiral gear driven by said first gear and having driving connection with the load to be driven whereby the end thrust effected through the spiral teeth of said gears will produce a driving pressure between the friction disk and the friction wheel proportional to the load to be driven.

5. In a power transmitting mechanism, the combination of a driving shaft, a friction wheel carried thereby, a driven shaft, a coöperating friction disk carried thereby and movable toward and from said friction wheel in the axial line of said driven shaft, a spiral gear driven by said friction wheel and axially movable therewith, a second spiral gear driven by said first gear, a belt pulley driven by said second gear, and a belt to the load to be driven, the end thrust effected through the spiral teeth of said gears producing a driving pressure between the friction disk and the friction wheel proportional to the load to be driven up to the maximum load permissible through said belt and pulley.

6. In a power transmitting mechanism, the combination of a driving shaft, a friction wheel mounted thereon, a driven shaft at right angles to said driving shaft, a friction disk on the driven shaft coöperating with said friction wheel, said driven shaft being mounted for axial movement in its bearings, a spiral gear attached to said shaft, a third shaft at right angles to said second shaft and a second spiral gear on said third shaft meshing with said first mentioned gear, said last mentioned shaft having driving connection with the load to be driven, the angle and pitch of said teeth being so proportioned relatively to the direction of rotation of said driven shaft as to produce a driving pressure between said friction members having a predetermined ratio to the load to be driven.

7. In a power transmitting mechanism, the combination of a driving shaft, a friction wheel mounted thereon, a driven shaft at right angles to said driving shaft, a friction disk on the driven shaft coöperating with said friction wheel, said driven shaft being mounted for axial movement in its bearings, a spiral gear attached to said shaft, a third shaft at right angles to said second shaft, a second spiral gear on said third shaft meshing with said first mentioned gear, said last mentioned shaft having driving connection with the load to be driven, the angle and pitch of said teeth being so proportioned relatively to the direction of rotation of said driven shaft as to produce a driving pressure between said friction members having a predetermined ratio to the load to be driven, and means for shifting the friction wheel transversely of the friction disk to bring said members into and out of engagement and vary their speed ratio.

8. In a power transmitting mechanism, the combination of a horizontal driving shaft, a vertical driven shaft mounted for axial movement above said driving shaft, a friction wheel on said driving shaft and a friction disk on said driven shaft having its end face resting freely on said friction wheel, a third shaft adapted to be connected to the load to be driven, and spiral gears between it and said vertical shaft having the pitch and angle of their teeth so related to the direction of rotation of the driven shaft as to produce a driving pressure between the friction wheel and the friction disk having a predetermined ratio to the load to be driven.

9. In a power transmitting mechanism, the combination of a horizontal driving shaft, a vertical driven shaft mounted for axial movement above said driving shaft, a friction wheel on said driving shaft and a friction disk on said driven shaft having its end face resting freely on said friction wheel, a third shaft adapted to be connected to the load to be driven, spiral gears between it and said vertical shaft having the pitch and angle of their teeth so related to the direction of rotation of the driven shaft as to produce a driving pressure between the friction wheel and the friction disk having a predetermined ratio to the load to be driven, means for shifting said driving wheel longitudinally of its shaft to disconnect said friction members and vary their speed ratio, and means for limiting the downward movement of said driven shaft when the disk is clear of the friction wheel.

Signed at New York city in the county of New York and State of New York this 7th day of January, 1916.

NICHOLAS POWER.

Witness:
ARTHUR J. LANG.

Copies of this patent may be obtained for five cents each, by addressing the "Commissioner of Patents, Washington, D. C."